Patented Aug. 4, 1925.

1,548,639

UNITED STATES PATENT OFFICE.

HEINRICH SPECKETER, OF GRIESHEIM-ON-THE-MAIN, JULIUS SÖLL, OF SCHWAN-HEIM-ON-THE-MAIN, AND ROBERT BILFINGER, OF GRIESHEIM-ON-THE-MAIN, GERMANY, ASSIGNORS TO CHEMISCHE FABRIK GRIESHEIM-ELEKTRON, OF FRANKFORT-ON-THE-MAIN, GERMANY.

PRODUCING ALUMINUM FLUORIDE-ALKALI-METAL FLUORIDE DOUBLE COMPOUNDS PRACTICALLY FREE FROM IRON.

No Drawing. Original application filed September 1, 1923, Serial No. 660,636. Divided and this application filed July 14, 1924. Serial No. 726,056.

*To all whom it may concern:*

Be it known that we, HEINRICH SPECKETER, a citizen of Germany, and residing at Griesheim-on-the-Main, JULIUS SÖLL, a citizen of Germany, and residing at Schwanheim-on-the-Main, and ROBERT BILFINGER, a citizen of Germany, and residing at Griesheim-on-the-Main, Germany, have invented certain new and useful Improvements in Producing Aluminum Fuoride-Alkali-Metal Fluoride Double Compounds Practically Free from Iron, of which the following is a specification.

This invention relates to the production of aluminum-alkali-metal fluorides of the chiolite or cryolite type or of mixtures thereof which may be used in the manufacture of aluminum or aluminum salts in a similar manner as pure cryolite as described in our copending application Serial No. 660,636, filed September 1, 1923, from which this application has been divided out.

We have found that aluminum-alkali-metal double salts of high pureness and especially practically free from iron are obtained from aluminum salts (especially from the products resulting from the extraction of argil or potter's earth with mineral acid) by treating the acid aluminous solutions after having filtered off the silicious residue with an alkali-metal salt and hydrofluoric acid or with mineral acids and alkali-metal fluorides under such conditions that the iron salt present is not precipitated together with the said aluminum-alkali-metal salts.

One method of precipitating the alumina whilst keeping the iron salt in solution consists in adding less hydrofluoric compounds than are required for the formation of aluminum-alkali-metal fluoride double compounds according to the reaction formula, that is to say at the most equivalent quantities of fluorine ions are to be added.

Another method of keeping the iron salt in solution has been found to consist in reducing to ferrous compounds the dissolved ferric salts, for instance by means of sulphuretted hydrogen. In this case hydrofluoric compounds may be added to any amount without contaminating with iron the products obtained.

As to the addition of alkali-metal salts there is no restriction. An alkali-metal salt of the acid which has served for extracting the aluminous ore may be used or an alkali-metal salt of another acid. By the action of the hydrofluoric acid the mineral acid is recovered in the filtrate, as far as it was combined with the aluminum and alkali-metal precipitated or added in excess, and this mineral acid either mixed or uniform may be used without further treatment for extracting new quantities of potter's earth. In order to avoid more mineral acid being formed by the action of the hydrofluoric acid than is required for the extraction of the aluminous ore alkali-metal fluoride may be wholly or partially substituted for alkali-metal chloride or sulfate.

In order to obtain the theoretical output of fluorine compounds it is advisable to employ an excess also of the alkali-metal salts, this excess not being lost, but being contained in the filtrate which may be used for extracting fresh quantities of potter's earth, so that the excess of added alkali-metal salts will not be lost.

After repeated use of the filtrate for extracting new quantities of potter's earth the iron will be progressively enriched in the solution, but this fact does not injure the quality of the aluminum-alkali-metal double fluorides obtained provided that the precise conditions explained in the following examples are observed, even if a larger quantity of iron than of aluminum is already present.

*Example 1.*

170 kilograms of a 20 per cent solution of hydrofluoric acid are successively added to 200 litres of filtrate from the extraction of argil or potter's earth with hydrochloric acid containing the equivalent 102.9 grms. of $Al_2O_3$ and 9 grms. of $Fe_2O_3$ per litre. The mixture is heated and stirred for half an hour. Then a hot solution of 110 kilograms of commercial sodium chloride in 350 litres of water is added and the heating is still continued for about 15 minutes to complete the precipitation of the aluminous compounds. The well filtered precipitate is sucked off in the heated state and washed out. It forms an aluminum-sodium fluoride which is practically free from iron.

The process may be modified in that the solution of common salt is first added to the aluminum salt solution and then the precipitation with hydrofluoric acid is effected. In this case care must be taken for efficacious stirring during the addition of the hydrofluoric acid in order to avoid any local excess of hydrofluoric acid in the reacting mixture as the iron salt would not be inert against such an excess and would be precipitated.

*Example 2.*

90 kilograms of sodium chloride dissolved in 250 litres of water are added to 200 litres of filtrate from the extraction of argil or potter's earth with hydrochloric acid. Hereupon the iron oxide salt is reduced to the ferrous compounds, e. g. by introducing sulphuretted hydrogen into the solution. Then the solution is heated to its boiling-point and 250 kilograms of a 20 per cent hydrofluoric acid solution are added. After sucking off and washing the product is practically free from iron.

*Example 3.*

500 kilograms of a 20 percent hydrofluoric acid solution are added to 500 litres of a solution containing the equivalent of 90.6 grams of $Al_2O_3$ and 16.0 grams of $Fe_2O_3$ per litre in the form of sulfates. The solution is heated to boiling and a hot solution of 170 kilograms of common salt in 500 litres of water is added. The precipitate of double compounds after washing and drying contains only traces of iron. The filtrate forms a mixture of hydrochloric and sulphuric acid which may again be used for extracting.

If it is desired to avoid such mixtures the ferric compounds may be reduced to the ferrous form and then the practically pure aluminum double fluorides precipitated by sodium sulfate according to the following.

*Example 4.*

In 200 litres of a solution containing the equivalent of 90.6 grams of $Al_2O_3$ and 16.0 grams of $Fe_2O_3$ per litre in the form of sulfates the ferric iron is reduced to ferrous iron by means of sulphuretted hydrogen. Then during stirring and heating a hot solution of 80 kilograms of sodium sulfate in 200 litres of water and 250 litres of a 20 per cent hydrofluoric acid are added. After sucking off and washing the double compound produced will contain only traces of iron.

The sequence of the additions of alkali-metal sulfate and hydrofluoric acid may be exchanged without the result being affected.

However it may be desirable in some cases to operate inversely with hydrochloric or sulfuric acid and alkali-metal fluorides instead of hydrofluoric acid and alkali-metal chloride or sulfate; this is especially the case when sodium fluoride is to be obtained in some process from double fluorides (if the latter are employed).

*Example 5.*

150 litres of concentrated hydrochloric acid are added to 200 litres of a hydrochloric acid extract from potter's earth containing the equivalent of 102.9 grams of $Al_2O_3$ and 9.3 grams $Fe_2O_3$ per litre. The solution is boiled and 120 kilograms of potassium fluoride are successively introduced. After short stirring the precipitate of potassium-aluminum fluoride is sucked off.

*Example 6.*

200 litres of hydrochloric acid extract as in the foregoing example are heated to 70–80 degrees centigrade, and a solution of 90 kilograms of sodium fluoride in 150 litres of concentrated hydrochloric acid is slowly introduced under stirring. The stirring is continued for a short time and the precipitate is sucked off.

The operations are susceptible of various other changes and modifications without departing from the spirit of the invention. Such for instance, the hydrofluoric compounds may be slowly added, the mixture digested for a while, and finally the alkali-metal salts may be added. Or one half of the hydrofluoric compounds may be added, the mixture may be digested for a while, and finally the rest of the hydrofluoric compounds and the alkali-metal salts may be added.

We claim:—

1. Process for producing aluminum-alkali-metal double fluorides practically free from iron, consisting in making aluminum salt solutions containing iron in its ferrous form, and precipitating under stirring and in presence of mineral acid the said double fluorides by the addition of substances which on dissolving in water form fluorine- and alkali-metal-ions.

2. Process for producing aluminum-alkali-metal double fluorides practically free from iron consisting in making aluminum salt solutions containing iron in the ferric form, reducing the said iron to its ferrous form, and precipitating under stirring and in presence of mineral acid the said double fluorides by the addition of substances which on dissolving in water form fluorine- and alkali-metal-ions.

3. Process for producing aluminum-alkali-metal double fluorides practically free from iron consisting in making aluminum chloride solutions containing iron in the ferric form, reducing the said iron to its ferrous form, and precipitating under stirring and in presence of mineral acid the said double fluorides by the addition of substances which on dissolving in water form fluorine- and alkali-metal-ions.

4. Process for producing aluminum alkali-metal double fluorides practically free from iron consisting in making aluminum salt solutions containing iron in the ferric form, reducing the said iron to its ferrous form, slowly adding under stirring and in presence of mineral acid, hydrofluoric acid, digesting the mixture for a while, and finally adding under continued stirring alkali-metal salts to precipitate the said double fluorides.

5. Process for producing aluminum alkali-metal double fluorides practically free from iron consisting in making aluminum salt solutions containing iron in the ferric form, reducing the said iron to its ferrous form, slowly adding under stirring and in presence of mineral acid only half of the hydrofluoric compounds required, digesting the mixture for a while and finally adding the rest of the hydrofluoric compounds and the alkali-metal salts to complete the precipitation.

In testimony whereof we affix our signatures in presence of two witnesses.

HEINRICH SPECKETER.
JULIUS SÖLL.
ROBERT BILFINGER.

Witnesses:
C. C. S. B. WYLES,
JANE SAUSTE.